(12) United States Patent
Sawhney et al.

(10) Patent No.: US 9,053,194 B2
(45) Date of Patent: Jun. 9, 2015

(54) METHOD AND APPARATUS FOR CORRELATING AND VIEWING DISPARATE DATA

(75) Inventors: Harpreet Singh Sawhney, West Windsor, NJ (US); Jayakrishnan Eledath, Robbinsville, NJ (US); Ajay Divakaran, Monmouth Junction, NJ (US); Mayank Bansal, Plainsboro, NJ (US); Hui Cheng, Bridgewater, NJ (US)

(73) Assignee: SRI International, Menlo Park, CA (US)

( * ) Notice: Subject to any disclaimer, the term of this patent is extended or adjusted under 35 U.S.C. 154(b) by 445 days.

(21) Appl. No.: 13/484,520

(22) Filed: May 31, 2012

(65) Prior Publication Data
US 2013/0198197 A1 Aug. 1, 2013

Related U.S. Application Data

(60) Provisional application No. 61/593,662, filed on Feb. 1, 2012.

(51) Int. Cl.
*G06F 17/30* (2006.01)
(52) U.S. Cl.
CPC ................................. *G06F 17/3087* (2013.01)

(58) Field of Classification Search
CPC .... G06F 1/0969; G06F 17/3087; G01C 21/36
USPC ........................................................ 707/705
See application file for complete search history.

(56) References Cited

U.S. PATENT DOCUMENTS

| | | | |
|---|---|---|---|
| 5,948,040 A * | 9/1999 | DeLorme et al. | 701/426 |
| 7,606,579 B2 * | 10/2009 | Thacher | 455/456.1 |
| 8,312,660 B1 * | 11/2012 | Fujisaki | 42/70.11 |
| 8,584,388 B1 * | 11/2013 | Fujisaki | 42/70.11 |
| 8,800,866 B1 * | 8/2014 | Gromley et al. | 235/380 |
| 2007/0129082 A1 * | 6/2007 | Thacher | 455/456.1 |

* cited by examiner

*Primary Examiner* — Baoquoc N To
(74) *Attorney, Agent, or Firm* — Moser Taboada

(57) ABSTRACT

A computer-implemented method comprising collecting data from a plurality of information sources, identifying a geographic location associated with the data and forming a corresponding event according to the geographic location, correlating the data and the event with one or more topics based at least partly on the identified geographic location and storing the correlated data and event and inferring the associated geographic location if the data does not comprise explicit location information, including matching the data against a database of geo-referenced data.

23 Claims, 9 Drawing Sheets

METHOD AND APPARATUS FOR CORRELATING AND VIEWING DISPARATE DATA

BACKGROUND

1. Field

Embodiments of the present invention generally relate to data correlation systems and, more particularly, to a method and apparatus for correlating and viewing disparate data.

2. Description of the Related Art

John Naisbitt's famous words often seem truer in today's world than ever before: "We are drowning in information, but starved for knowledge." Increasingly, there are many different, widely available sources of data such as social networks, news sites and newsfeeds, blogs, webcams, and a wide variety of other private and public sources for diverse types of data including photos, videos, and textual content. This creates a growing need for better, more coherent ways to correlate, and to derive semantic information from, the multiple multimodal sources of information, and to view and navigate all of this data in an organized and meaningful way. Conventional search engines and information retrieval systems, however, are often weak at synthesizing data from multiple sources and channels over multiple modalities that needs to be correlated and "aligned" along multiple dimensions such as geo-space, time, with other entities, events and their semantics.

Current research on cross-modal association tends to rely on an underlying assumption that the different modalities have strongly correlated temporal alignment, which is not always the case. The "Semantic Web" (see http://www.w3.org/2001/sw/) is an example of a technological approach to enable derivation of meaning and associations from web-based content that has been manually semantically "tagged". However, much of the data that is available and continues to be published on the Internet is not semantically tagged at present. Geo-location, for example, can potentially be an important cue in cross-modality association. However, much of the image and video content available on today×s Internet may not include location metadata, much less precise geo-location and orientation coordinates, and so it cannot readily be correlated and reasoned about with regard to its geographical location, for example. Broadly speaking, cross-modality association is difficult in part because it entails interpreting signals at a semantic level in order to make correlations, and there remain significant technological challenges in solving the problem of correlating cross-modal data to produce meaningful inferences.

Therefore, there is a need in the art for a method and apparatus for aligning, correlating and viewing disparate data along multiple dimensions (geo-space, time, entities, events and their semantics) in order to produce meaningful inferences, based on cross-modal data streams.

SUMMARY

Embodiments of the present invention relate to an apparatus for collecting data from a plurality of information streams comprising a collection module, a geo-localization module, coupled to the collection module, for geo-localizing the plurality of information streams to identify a geographic location for multiple events extracted from the data, and a correlation module, coupled to the geo-localization module and the collection module, for correlating the plurality of information streams based on the geo-localization and the event and storing correlation data in a database.

Embodiments of the present invention relate to a computer-implemented method comprising collecting data from a plurality of information sources, identifying a geographic location associated with the data and forming a corresponding event according to the geographic location, correlating the data and the event with one or more topics based at least partly on the identified geographic location and storing the correlated data and event and inferring the associated geographic location if the data does not comprise explicit location information, including matching the data against a database of geo-referenced data.

Embodiments of the present invention relate to an apparatus for comprising a collection module for collecting data from a plurality of information sources, a geo-localization module, coupled to the collection module, for identifying a geographic location associated with the data and forming a corresponding event according to the geographic location, a correlation module, coupled to the geo-localization module and the collection module, correlating the data and the event with one or more topics based at least partly on the identified geographic location and storing correlation data in a database and an inferencing module for inferring the associated geographic location if the data does not comprise explicit location information, including matching the data against a database of geo-referenced data.

Further embodiments of the present invention relate to a computer-implemented method comprising collecting data from a plurality of information sources, identifying a geographic location associated with the data for the event and displaying a computer-generated map wherein the data can be accessed via user interaction with the map based on the geographic locations identified respectively for the data.

BRIEF DESCRIPTION OF THE DRAWINGS

So that the manner in which the above recited features of embodiments of the present invention can be understood in detail, a more particular description of the invention, briefly summarized above, may be had by reference to typical embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention relate to a method and apparatus for automatically correlating data from independent, distributed data sources (online or offline), and ad-hoc sensors as well as planned sensors. Some embodiments include methods for geo-locating the data, in order to facilitate correlating data regarding currently occurring events with respect to particular locations. Various statistical analyses and image processing techniques are utilized in order to extract location specific information and to otherwise correlate the data; in some embodiments, such techniques are also employed to predict future movements and changes within a situation represented by the data. The analyzed and correlated data is presented in a navigable and interactive manner to a user of the system. In some embodiments, a common operating picture (COP) for a current situation of interest is produced, providing situational awareness to a plurality of commanders, analysts, or other cooperating users.

Figure 1:
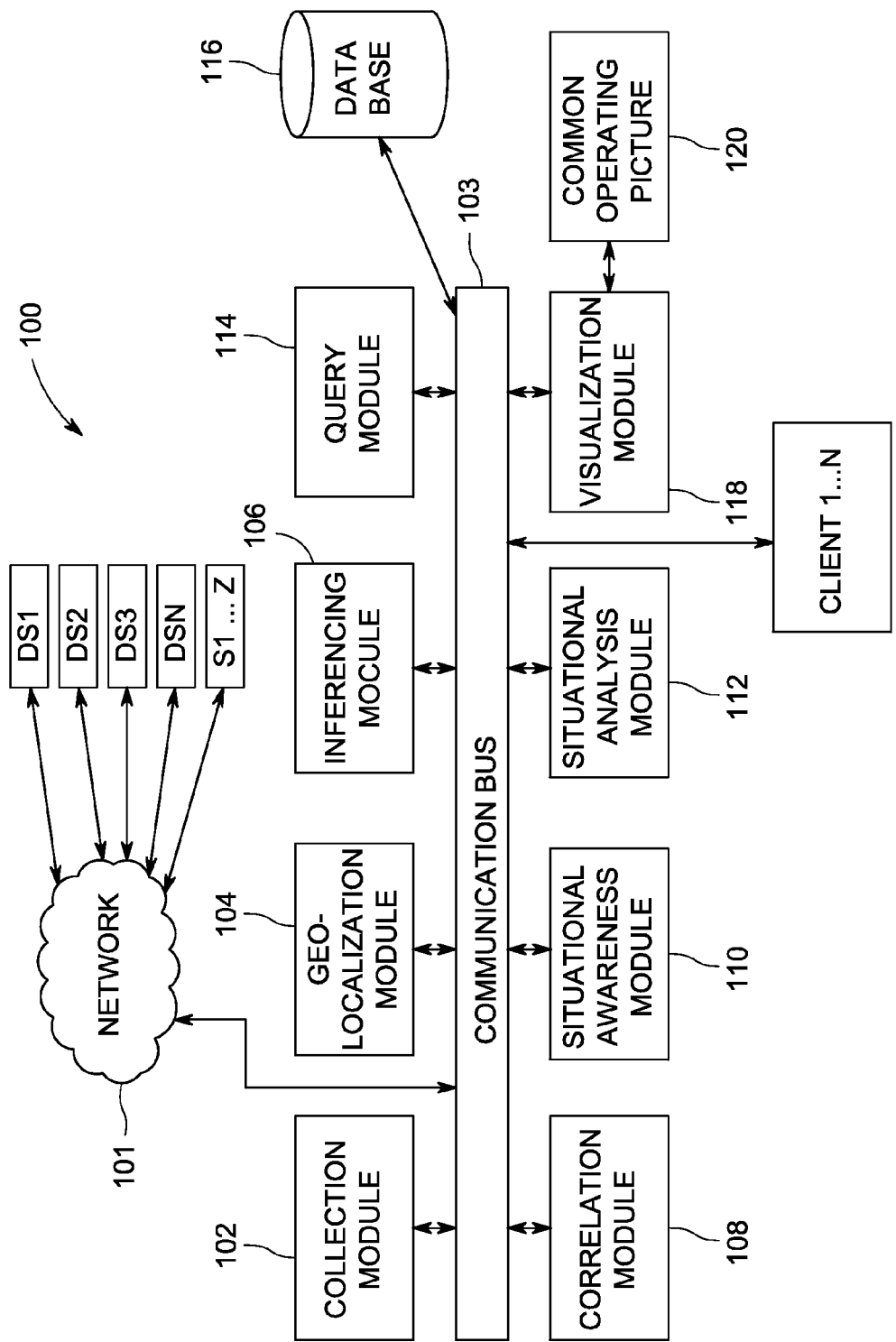
FIG. 1 is a functional diagram of an exemplary embodiment of an apparatus for correlating and viewing disparate data in accordance with at least one of the embodiments of the present invention.

FIG. 1 is a functional diagram of an exemplary embodiment of an apparatus 100 for correlating and viewing disparate data in accordance with one or more embodiments of the present invention. In an exemplary embodiment, the apparatus 100 comprises an information stream collection module (collection module) 102, a geo-localization module 104, an inferencing module 106, a correlation module 108, a situational awareness module (SAWM) 110, a situational analysis module (SANM) 112, a query module 114, a visualization module 118 and a database 116, all coupled to a central communication bus 103 for inter-module communication. The apparatus 100 is coupled to the internet via network 101. The network 101 enables the apparatus to be remotely coupled to various data streams produced by a plurality of independent, distributed data sources, ad-hoc sensors (or "sensors in the wild") such as DS1, DS2 . . . DSN. In an exemplary embodiment, the apparatus 100 may also receive data from planned sensors S1 . . . Z, where Z, the number of planned sensors and N, the number of ad-hoc sensors are adjustable based on the needs of particular applications. In an exemplary embodiment, the data streams DS1, DS2 . . . DSN comprise online news feeds, Twitter® feeds, Facebook® feeds, data from various social networks, audio/video feeds, and the like. Accordingly, the apparatus 100 is configurable to monitor many diverse feeds, and users of apparatus 100 can add data feeds on a real-time basis.

The collection module 102 is configured to periodically extract data from the various data streams DS1 . . . DSN through the network 101. The collection module 102 works with any type of data stream, can extract entities and events in the stream, and space-time semantic relationships between the events and entities. According to one embodiment, the collection module 102 works in continuous mode and operates on streaming data. The collection module 102 extracts data and stores the data in the database 116 according to configuration parameters of the apparatus 100 such as period of extraction, data stream list, and the like. The geo-localization module 104 analyzes the data in the database 116, and preferably uses a variety of techniques to automatically identify the geographic location of particular scenes and situations that are depicted in or referred to in the data and to form an event based on the geo-localization. For example, for textual content, the system may use keyword and/or semantic analysis of the content to determine relevant location(s). For audio content, voice recognition techniques may first be employed to convert the audio signal to text. For video and other image content, if location metadata is included, then geo-localization module 104 may determine image location from the meta-data in a straightforward manner; otherwise, in some embodiments, module 104 automatically determines locations of images by employing techniques such as analysis and matching of landmarks and other image features against an existing geo-referenced image database (e.g. a satellite image database, Google Earth, etc.) as described in commonly assigned and co-pending U.S. Provisional Patent Application Ser. No. 61/495,777, filed Jun. 10, 2011 and U.S. Provisional Patent Application Ser. No. 61/495,765, filed Jun. 10, 2011, hereby incorporated in their entirety by this reference. If extremely precise registration of image content extracted by collection module 102 against reference images is desired, then registration techniques such as described in U.S. Pat. No. 6,597,818 filed Mar. 9, 2001, which is hereby incorporated by reference in its entirety herein, can also be employed.

The geo-localization module 104 is coupled to the collection module 104 as well as the correlation module 108 through the communication bus 103. According to an exemplary embodiment, the correlation module 108 is also coupled to the collection module 102 and the database 116. The database 116 stores geographical matching data as well as the correlated data from the various data streams S1 . . . SZ and DS1 . . . DSN. The database 116 is indexed in a way that accessing data is fast and efficient. In exemplary embodiments, the database 116 is indexed categorically, i.e., by keywords, geographic location as determined by the geolocalization module 104 and event and object indexing by the situational analysis module 112, amongst others. Image descriptors and visual features, descriptions and visual features of videos, categorizing tags and the like are stored in the database 116 to facilitate semantic alignment of the multiple media streams, as described in more detail below, and to facilitate user querying through the query module 114.

The correlation module 108 correlates data from the various information streams in the database 116 with each other. The correlation module 108 generates groups of correlations and stores these in, for example, relational database tables in database 116 corresponding to the formed events. For example, if a textual news report regarding the formation of a protest is extracted from DS1, video data of the protest is extracted from DS2, and audio clips from analysts discussing the protest and possible spill-over into other locations and the like are extracted from DS3, the correlation module 108 correlates all of these various streams with each other as relating to a particular protest, by semantically analyzing text (including text derived by recognition of audio) and/or imagery to recognize, for example, the overarching theme of a protest and perhaps keywords, names, faces, or other characteristics associated with the particular protest event, along with geolocation data determined by the geo-localization module 104. In other instances, sets of definitions and models describing current events of interest, are manually input to correlation module 108 to determine correlations. The correlation module 108 is coupled to the situational analysis module 112 for analyzing the correlated data by extracting entity classes such as groups of people, vehicles and the like, and reasoning about the extracted entities within a scene (e.g., recognizing what appears to be a group of people chasing someone or surrounding a building, etc.). Additionally, the correlation module 108 couples with the SAWM 110 to determine, based on the extracted entities, possible strategies for addressing the protest from a particular perspective, for example, a law enforcement perspective, or a journalist's perspective.

The extracted entity, event and relationship information (including correlation and situational analysis) is stored in database 116 and clients 1-N can subsequently submit a query through the query module 114 relating to, for example, a particular entity associated with the protest or about the protest itself. In some embodiments, query module 114 accepts simple natural language search terms such as "protest on Smith St." and the like, and generates a corresponding database query. The visualization module 118 renders a view for users of client 1 . . . N of the correlated data responsive to a user's query. Based on the users selection of output preferences for client 1 . . . N, the visualization module 118 will form the data and only show those entities/events that are responsive to the user's query, or that the correlation module 108 has determined are correlated to events and entities responsive to the user's query, based on a statistical analysis. To use the prior example, if a user is interested in the "Protest on Smith St.," the correlation module also correlates similar protests in other locations, and shows media related to those events through the visualization module 118 to clients 1 . . . N. The correlation module 108, according to this embodiment, performs correlations in real-time based on user's searches. In other embodiments, the correlation module 108 performs correlations passively, i.e., correlates data collected through the collection module 102 and performs the correlations in the background and these correlations are the basis of search results provided to users. In addition, in some embodiments, the SAWM 110 creates a common operating picture (COP) 120, where the COP shows strategic routes and paths, movement of entities within an area, danger zones and the like. The COP assists collaborating analysts in evaluating breaking events by providing them with a consistent, up-to-date picture of a crisis through the visualization module 118.

Figure 3:
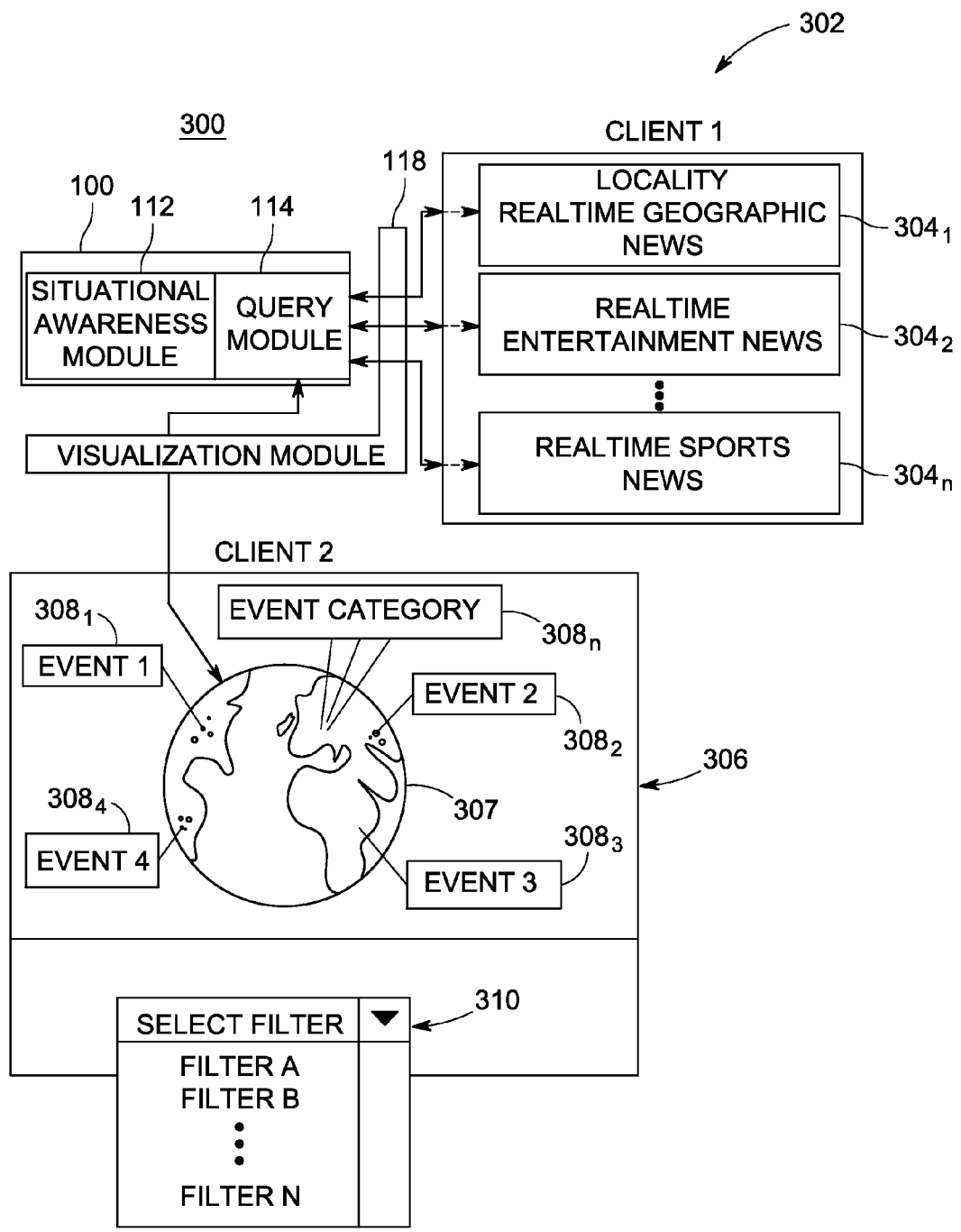
FIG. 3 is an illustration of the output of a visualization module in accordance with at least one embodiment of the present invention

In exemplary embodiments, the apparatus 100 is a server which accepts query requests through the query module 114 and sends responses of events and analysis based on the received query to various external sources such as search engines, direct clients, downstream information services and the like. In other embodiments, the apparatus 100 hosts an interactive online portal where users can view the data in various ways as shown in FIG. 3 below. The inferencing module 106 is coupled to the database 116 as well as the query module 114 and makes predictions based on recognizing patterns of movement, moods of the crowd, and the like.

Figure 2:
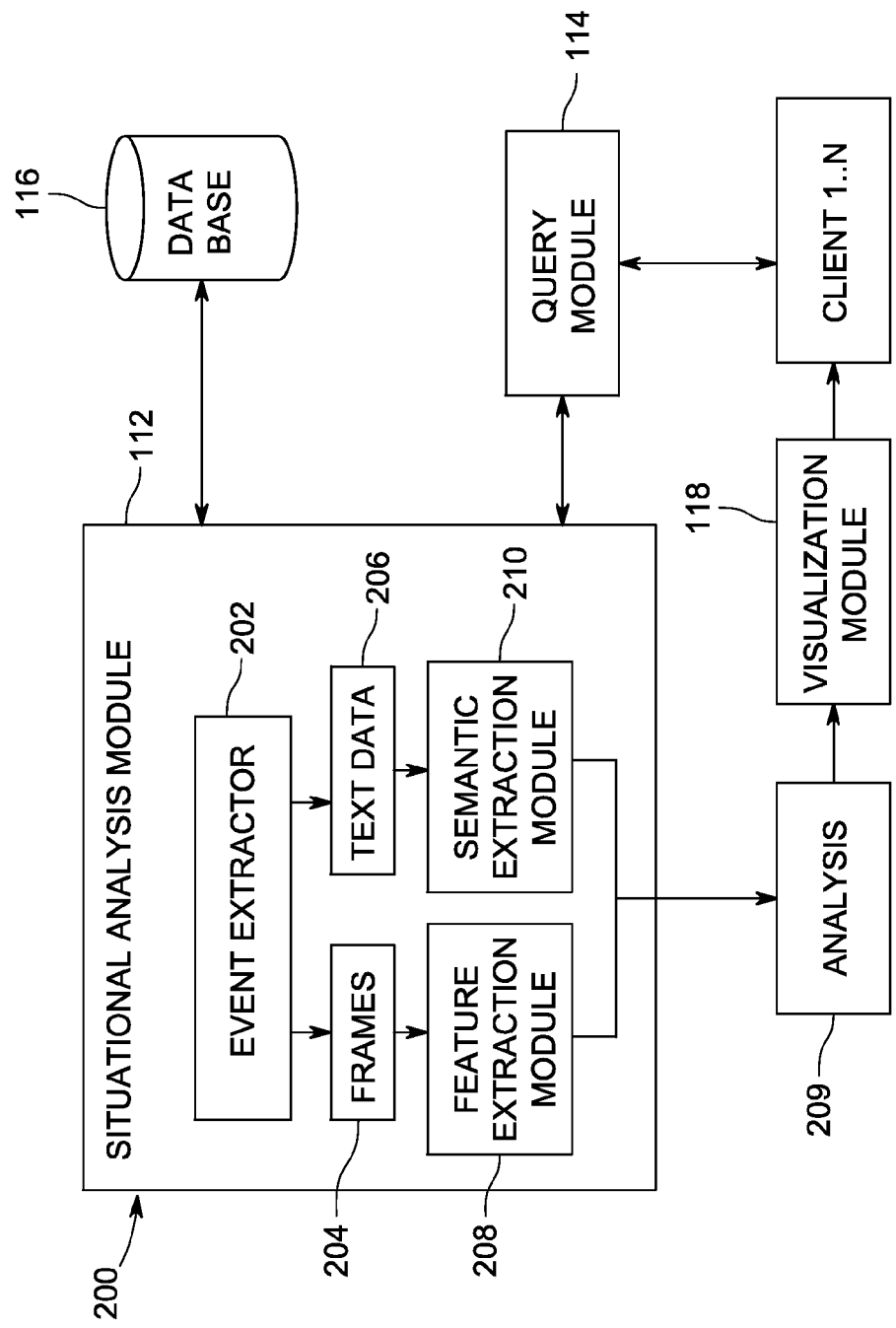
FIG. 2 is a block diagram of the situational analysis module (SANM) in accordance with an exemplary embodiment of the present invention.

FIG. 2 is a block diagram of the situational analysis module (SANM) 112 and its various couplings in apparatus 100 in accordance with an exemplary embodiment of the present invention. The SANM 112 analyzes the correlated data by extracting entity classes such as groups of people, vehicles and the like, and reasoning about the extracted entities within a scene. The SANM 112 comprises an event extractor, and a semantic correlation module 210. The Event Extractor can work with multiple modalities such as text streams, documents, images and videos amongst others to extract textual and image data of interest and their attributes from the events stored in the database 116 by the correlation module 108. Events and their attributes can be extracted from text streams and documents using statistical text analysis and distributional alignment and co-clustering as described in the paper entitled "New Experiments in Distributional Representations of Synonymy," Ninth Conference on Computational Natural Language Learning (CoNLL), Ann Arbor, Mich., (2005) by Dayne Freitag, Matthias Blume, John Byrnes, Edmond Chow, Sadik Kapadia, Richard Rohwer, and Zhiqiang Wang as well as "Simmered Greedy Optimization for Co-clustering," ITNG, Seventh International Conference on Information Technology, Las Vegas, pp. 410-419, (2010) by Sadik Kapadia and Richar Rowher, both herein incorporated by reference in their entirety. The SANM 112 is coupled with the database 116 as well as the query module 114 and the visualization module 118 through communication bus 103 (not shown). SANM 112 performs analysis on the data correlated by the correlation module 108. The SANM 112 couples with the database 116 to retrieve and analyze the data. The event extractor 202 parses the multi-media data and extracts frames 204 of video or images, or descriptions of those frames and textual data 206 highlighting newscasts, TWEETS®, blog and FACEBOOK® posts and the like.

The feature extraction module 208 analyzes frames 204 by algorithmically classifying entities such as moving persons and vehicles into groups for tracking, for example by performing a "history of oriented occurrences" algorithm as described in commonly owned pending U.S. patent application Ser. No. 12/489,667, which is incorporated by reference in its entirety herein. In addition to the HO2 like techniques, event extraction in images and videos can be carried out by computing features related to movement, appearance, shape and semantic entities such as people, vehicles, etc. Furthermore, unknown events of interest can be discovered by computing distributions over features and looking for anomalies with respect to known events or statistical trends.

The semantic extraction module 210 parses the textual data 206 to extract entities based on correlated data from the correlation module 108. The output of the semantic extraction module 210 and the feature extraction module 208 combine to generate a complete analysis 209 related to the clients' 1 . . . N particular query through the query module 114. The visualization module 118 organizes and groups the various data points into a seamless view for simple navigation and easy access to relevant data by the clients $116_{1...n}$. Additionally, spatial and temporal gating is used to limit the size of semantic alignment problems associated with the semantic extraction module 210 For example, if a first sensor (not shown in FIG. 2) observed an event, say people running out of a building, and a second sensor (not shown in FIG. 2) observed people running into a building, based on the geo-location of the two sensors and buildings, and the time of the two events, it can be determined whether the two events are correlated. Semantic alignment addresses the issue of where multiple streams from the data streams are related to the same event and need to be aligned semantically.

In other exemplary embodiments, face-name association is performed using statistical matching to present the user with associated text, video and other multimedia about particular popular personalities, as described in the [Nadeu 2007], [Wacholder 1997] and [Berg 2004] papers, herein incorporated by reference in their entirety.

[Nadeu 2007]: http://cogprints.org/5859/1/Thesis-David-Nadeau.pdf

[Wacholder 1997]: Nina Wacholder, Yael Ravin, Misook Choi: *Disambiguation of Proper Names in Text. ANLP* 1997: 202-208.

[Berg 2004]: *Names and Faces in the News*, Tamara L. Berg, Alexander C. Berg, Jaety Edwards, Michael Maire, Ryan White, Yee Whye Teh, Erik Learned-Miller, David A. Forsyth *Computer Vision and Pattern Recognition (CVPR)*, 2004.

FIG. 3 is an illustration of the output of the visualization module 118 in accordance with at least one embodiment of the present invention. Client window 302 represents a client's view when using a web-browser to access services offered by the apparatus 100. In other embodiments, client 302 may be a thick client or a thin client accessing web services published by the apparatus 100. Several different types of clients can simultaneously access the services of apparatus 100. A user accesses the services of apparatus 100 through client window 302, by submitting a search term or the like to the query module 114. The query module 114 couples to the database 116 through the communication bus 103 to generate a real-time or near real-time list of events related to the input query as they occur and as data for such events is publicly posted in online data sources. In an exemplary embodiment, the view is divided into several sections of news, where group $304_1$ shows real-time local geographic news, $304_2$ shows real-time entertainment news and group $304_n$ showing real-time sports news. These groups $304_{1 \ldots n}$ are populated according to the user's query. Additionally, the client window 302 can show related relevant items and predictions inferred by inferencing module 106 of the apparatus 100. The groups $304_{1 \ldots n}$ are being continually updated by the SANM 112 which is constantly monitoring database changes for new information streams based on the user's interests. The SANM 112 may also be driven by system level criteria in some embodiments such as preconfigured settings for particular topics, events, locations or the like, according to the preference of a user or organization.

Client window 306 is also accessible remotely through a web-browser window or on a thick client display via execution of a desktop application, and the like. Client window 306 displays an Earth model 307, manipulable by a client cursor to display differing sections of the globe. A user may select a presentation filter using drop-down box 310. In exemplary embodiments, filters can be entities such as individuals or cars, objects, specific events and the like. Further, the model 307 is shown according to a modality selected by the user. The user may also select a different modality such as a conceptual modality showing groupings of concepts, a breaking-news modality or a climate modality each of which may be represented as a different graphical user interface. A user may view all related media for a particular filter and the global view 307 displays various event labels such as $308_1$ to $308_4$. The user may select a particular event label to read a story and watch associated videos and an analysis of a particular event, enter a new query term to repopulate the global view with new labels, or rotate the globe view as new relevant stories are correlated by apparatus 100 and updated to the view by the visualization module 118.

In an exemplary embodiment, the apparatus 100 makes predictions based on the existing data in database 116 and, while the correlation module 108 is correlating data, statistical interpretation is performed by the SAWM 110 (as described below) and the situational assistant 111 assists those in need of "on the ground" knowledge, exit strategies, paths, and the like.

In some embodiments, client windows 302 and 306 present an organized view of events selectively chosen for their particular relevancy to not only the user's query, but an individual long-term profile of the user indicating e.g. locations, categories, and people of interest to that user. Such a profile can be created by soliciting explicit user input (e.g. by questionnaire), and/or can be inferred by system 100 by employing machine learning algorithms with respect to the interactive viewing selections made over time by various users. A meaningful organization of images and videos is presented to the user, where the images and videos are a subset of relevant data items that are also viewable on user, as opposed to all relevant data available in the database 116. The user may also place the views into static mode that does not update in real-time, or customize the updating of the information streams to only update with a particular frequency. Alternatively, the user may view all event data to synthesize responsive data in a visually coherent way, for example, by integrating time-sequenced, geo-located images and text with a map of the location of interest for important events and the like for future querying, or just as a world-wide event viewer.

Figure 4:
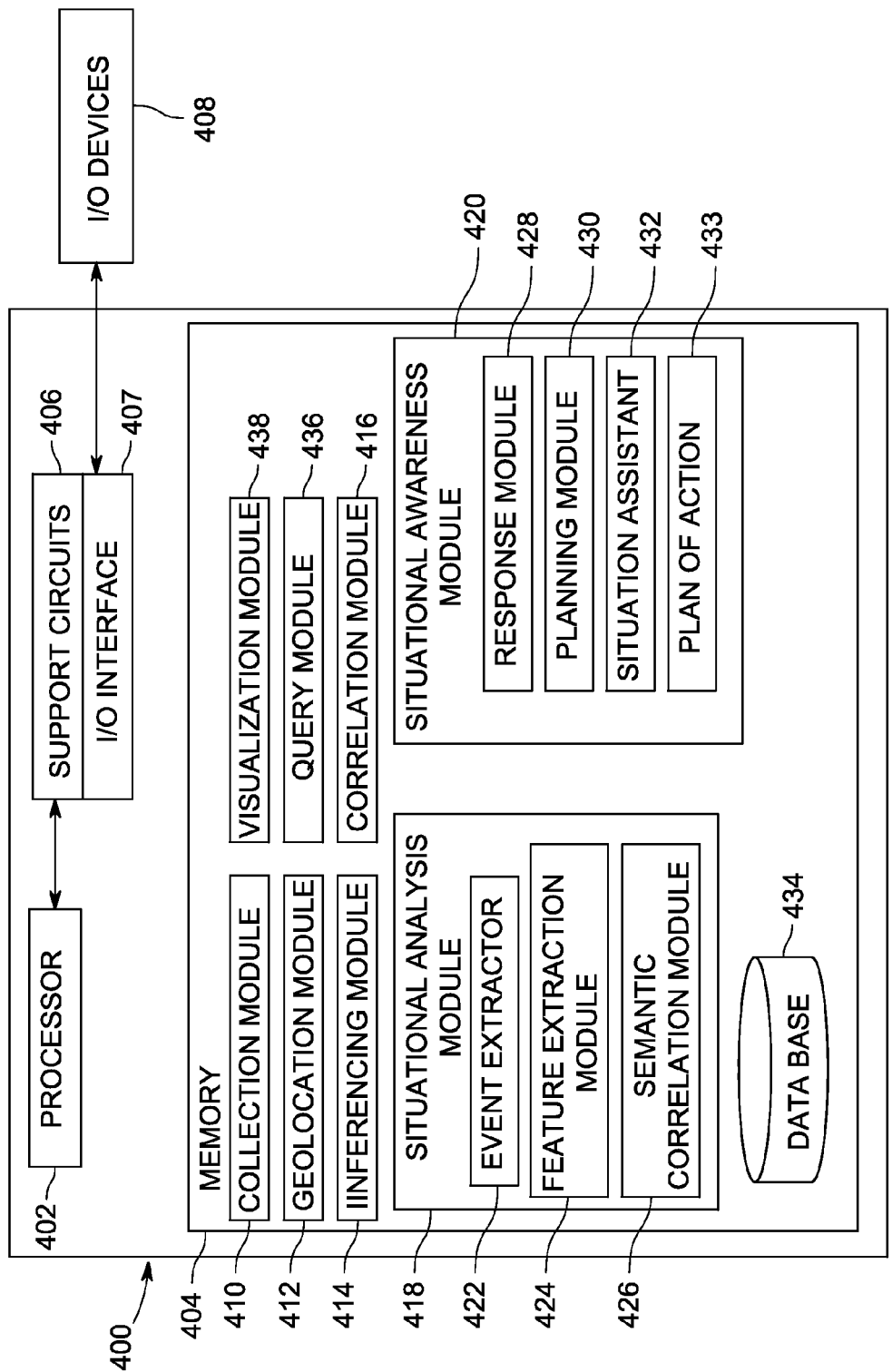
FIG. 4 is a block diagram depicting an exemplary embodiment of a computer system in accordance with one or more aspects of the invention.

FIG. 4 is a block diagram depicting an exemplary embodiment of a computer system 400 in accordance with one or more aspects of the invention. The computer system 400 represents one embodiment of a system used to implement the apparatus 100. The computer system 400 includes a processor 402, a memory 404 and various support circuits 406. The processor 402 may include one or more microprocessors known in the art, and/or dedicated function processors such as field programmable gate arrays programmed to perform dedicated processing functions. The support circuits 406 for the processor 402 include microcontrollers, application specific integrated circuits (ASIC), cache, power supplies, clock circuits, data registers, I/O interface 407, and the like. The I/O interface 407 may be directly coupled to the memory 404 or coupled through the supporting circuits 406. The I/O interface 407 may also be configured for communication with input devices and/or output devices 408, such as, network devices, various storage devices, mouse, keyboard, displays, sensors and the like.

The memory 404 stores non-transient processor-executable instructions and/or data that may be executed by and/or used by the processor 402. These processor-executable instructions may comprise firmware, software, and the like, or some combination thereof. Modules having processor-executable instructions that are stored in the memory 404 comprise a collection module 410, a geo-localization module 412, an inferencing module 412, a correlation module 416, a situational awareness module 420, a situational analysis module 418, a query module 436 and a visualization module 438. The situation analysis module 418 further comprises an event extractor 422, a feature extraction module 424 and a semantic extraction module 426. The situational awareness module 420 comprises a planning module 428, a response module 430 and a situation assistant 432 for generating a plan of action 433. In an exemplary embodiment, the memory 404 may include one or more of the following: random access memory, read only memory, magneto-resistive read/write memory, optical read/write memory, cache memory, magnetic read/write memory, and the like, as well as signal-bearing media as described below.

Figure 5:
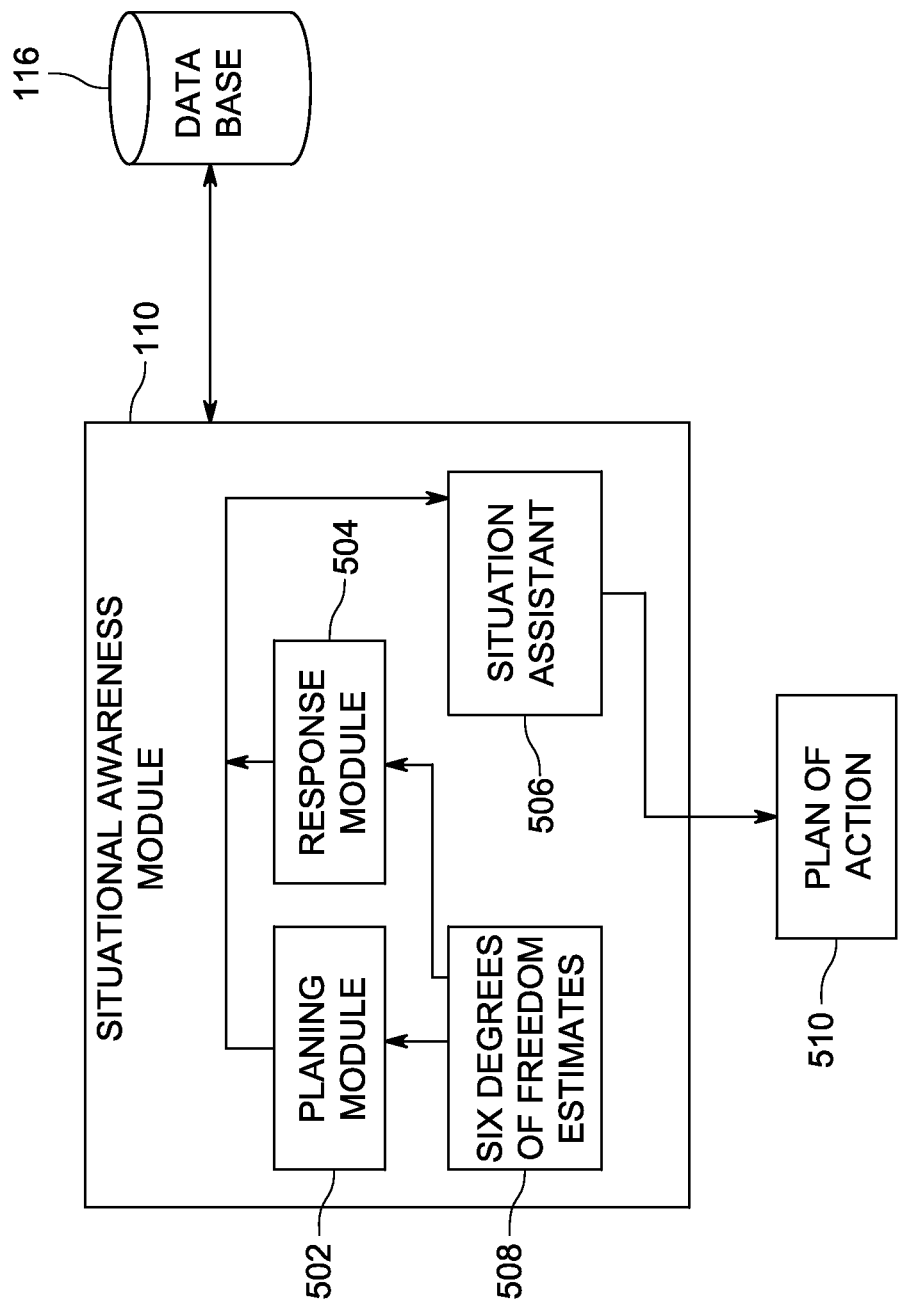
FIG. 5 is a block diagram of a situational awareness module in accordance with one or more aspects of the invention.

FIG. 5 is a block diagram of the situational awareness module 110 with its various couplings in apparatus 100 in accordance with one or more aspects of the invention. The SAWM 110 comprises a planning module 502, a response module 504, and a situation assistant 506. The SAWM 110 is coupled with the database 116 to retrieve correlated objects, events and locations. The planning module 502 uses six degrees of freedom (6 DOF) estimates to plan exit strategies and exit routes, as described in commonly assigned pending U.S. patent application Ser. No. 13/217,014, which is hereby incorporated by reference in its entirety. The response module 504 uses the 6 DOF estimates to plan coordinated responses to situations which may be possibly dangerous. The situation assistant 506 evaluates the planning and responses and develops a plan of action 510 for personnel involved in the situation or event being analyzed to follow and execute.

Figure 6:
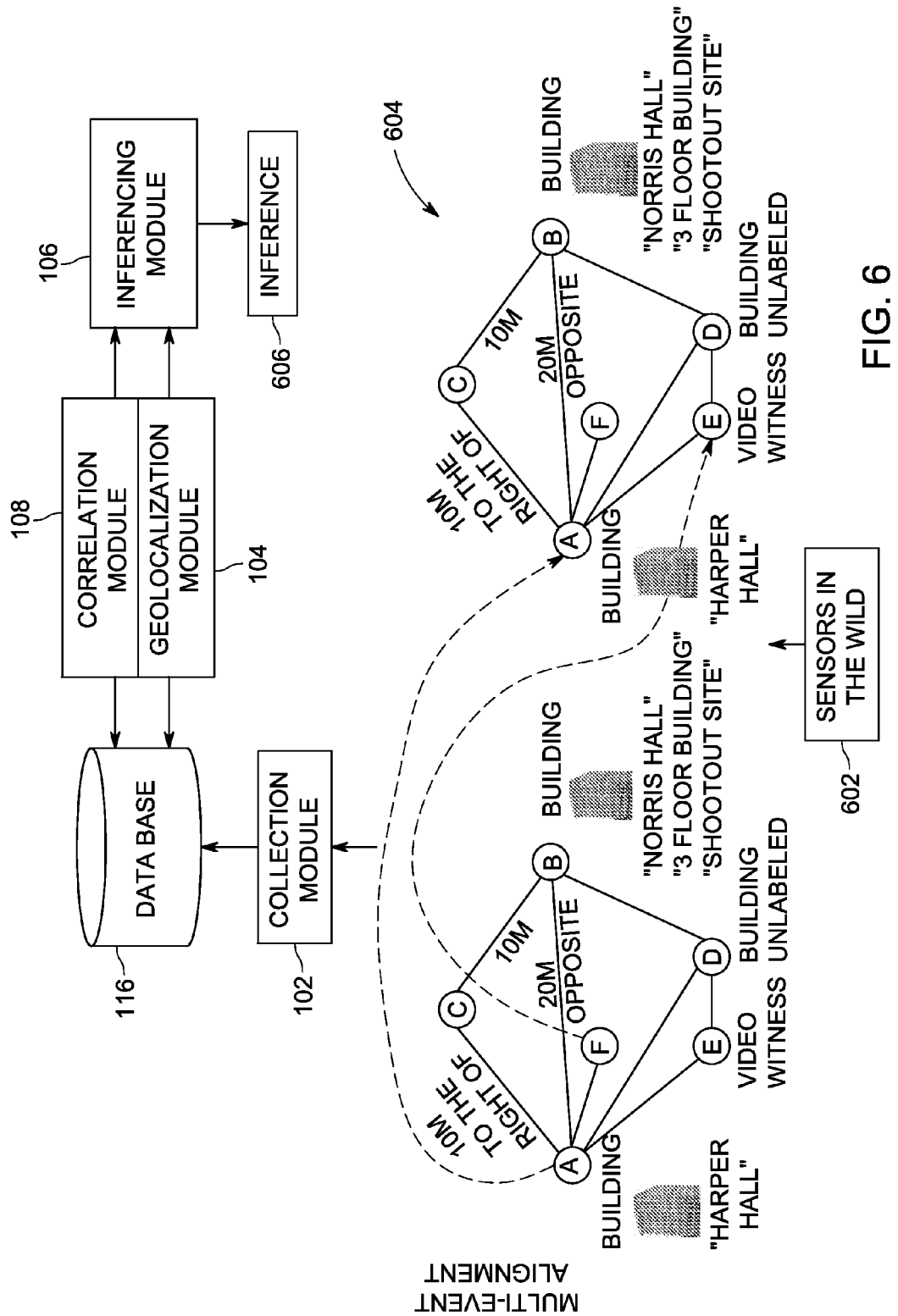
FIG. 6 is a functional block diagram showing an example of generating an inference through inferencing module.

FIG. 6 is a functional block diagram showing an example of generating an inference through inferencing module 106. Sensors in the wild 602 along with planned sensors, such as aerial cameras and the like, capture videos and images of objects and things such as people and locations, collectively referred to as entities 604. In this example, image, audio, and/or other sensory data captured by sensors 602 is augmented with related information about each entity, such as the names of buildings, the distances between them, actors and their paths, and location information. According to one embodiment, the augmentation is accomplished by transmitting a request to a geographical information system (GIS) web service database with road network and urban infrastructure data. The entities 604 and the related data for each are collected by the collection module 102 and stored in the database 116. As needed, geolocalization module 104 locates the entity in a particular location and the correlation module 108 correlates the various different types of data streams involving the entities. The inferencing module 106 draws one or more inferences 606 based on scene data gathered by sensors 602. For example, analysis of video frames captured by one or more of sensors 602 could result in recognition of events including: (a) at 7:46 AM, a car rapidly gained speed and departed the area of $30^{th}$ St. Station, (b) at 7:47 AM, an explosion occurred on Track 6 of $30^{th}$ St Station, (c) at 7:48 AM, crowds of people ran towards Exits 2 and 3, and (d) a stampede was observed at 7:50 AM" Higher-level, explanatory inferences drawn by module 106 may include that the explosion was the reason for the running crowd and the resulting stampede, and may include a hypothesis that the speeding car was driven by perpetrators of the explosion. Inferences will be derived using representation of entities, events and their relationships including locations, time, etc, with graphical models. Graphical models enable representation of complex events and interactions using local dependencies. Inferencing with graphical models is used to derive statistical distributions for the represented entities, events and their relationships.

Figure 7:
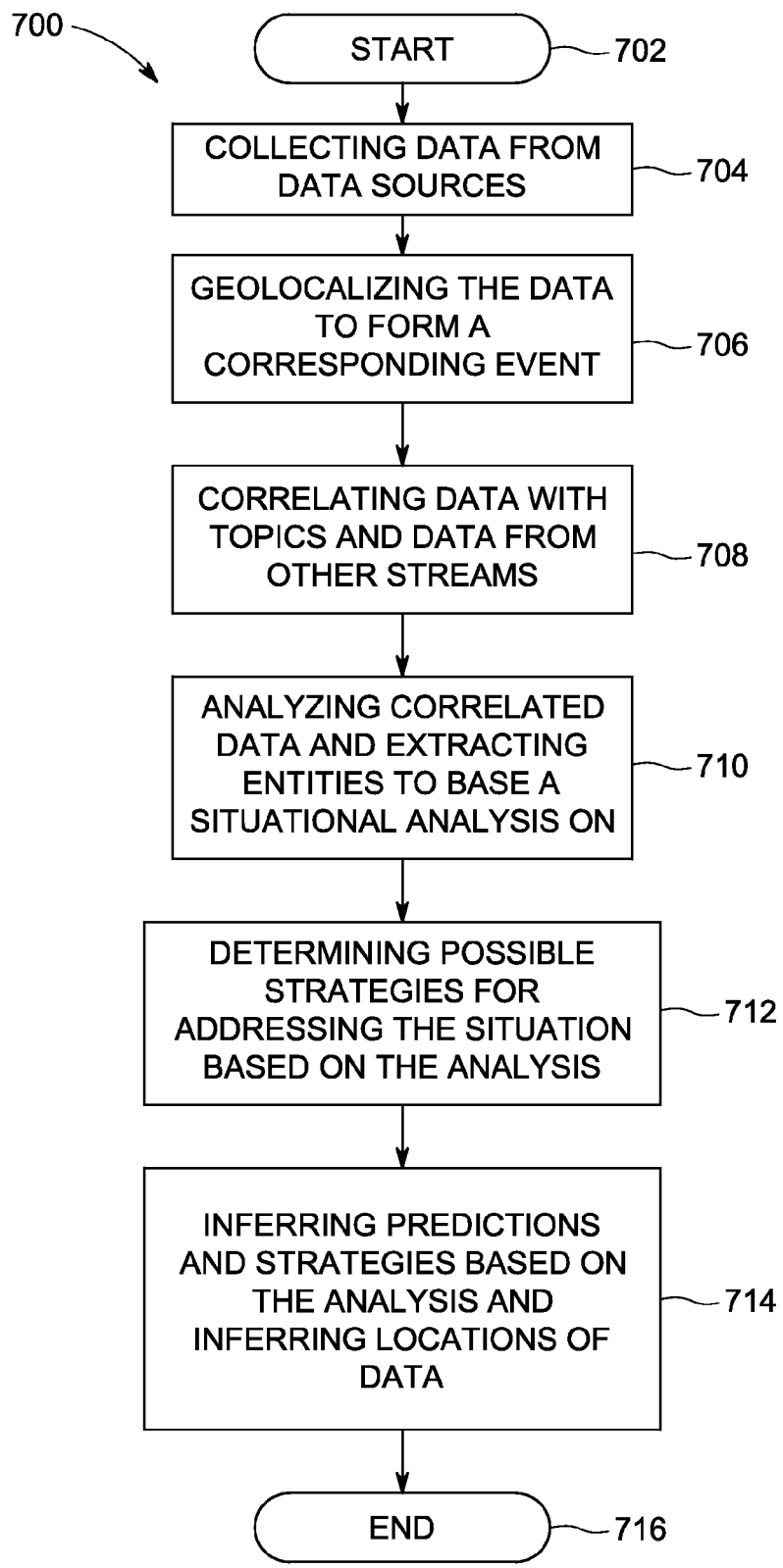
FIG. 7 is a flow diagram for a method for correlating disparate data in accordance with at least one embodiment of the present invention.

FIG. 7 is a flow diagram for a method 700 for correlating disparate data in accordance with at least one embodiment of the present invention. The method 700 is an implementation of the operation of apparatus 100 in FIG. 1, stored in memory 404 of the computer 400 and executed by the processor 402. The method begins at step 702 and proceeds to step 704 where data is collected from online data sources or sensors, including "Sensors in the wild" (ad-hoc sensors) shown in FIG. 1 $DS_{1...N}$ as well as planned sensors $S_{1...Z}$. Step 704 is performed by the collection module 102, where in one embodiment the collection module includes one or more web-crawlers searching online data sources such as news feeds, Twitter® feeds, Facebook® posts and the like. Such crawling may be performed, in some embodiments, at periodic intervals according to a base metric determined by a configuration of the apparatus 100. The online data sources may be publicly available, and in some embodiments one or more of the data sources may comprise personal or private sources available only to an individual user or to a select group of users.

At step 706, the geo-localization module 104 identifies the location of ("localizes") the data collected from the sensors and encodes these locations in searchable tags associated with the corresponding items of localized data. If location information is explicitly provided (e.g. as metadata) for a given item of data, then localizing such data is straightforward. When such metadata is not provided, then module 104 seeks to infer location using one or more applicable automated techniques. For example, textual content is parsed for any locations mentioned; the IP address of a live feed can be examined to establish a presumed or estimated geographic location of the data collected from that source; video and other image content can be analyzed using feature matching techniques with respect to a known geo-referenced image database. For example, given an area-of-interest such as a neighborhood or city, a feature database is created using both satellite (SAT) and oblique bird's eye-view (BEV) imagery covering the area. The SAT and BEV data are fully geo-referenced and, according to an exemplary embodiment, are received through satellite communications. SAT provides orthographic top-down views of the scene while BEV provides oblique viewpoints. By combining the two, building outlines as well as building facades can be extracted. SAT images provide the outlines while one or more of the BEV images are used to locate the corresponding buildings and extract facades. Features are computed that capture the statistical self-similarity (or dissimilarity) of local patches on a building facade with respect to other patches on the facade. Since these features essentially capture the local appearance statistics, they are robust to viewpoint and global appearance changes and can be computed in a similar manner for street view images collected from the sensors shown in FIG. 1 as well and then robustly matched with the features stored in the feature database. The location of the street view image can thus be determined from the known location of the matching, geo-referenced satellite data. For further information, refer to U.S. Provisional Patent Application Ser. No. 61/495,777, filed Jun. 10, 2011.

Once each feed is geo-localized, the results are stored in the database 116. The method then moves to step 708 where the textual, graphical, audio, video and other data items are correlated with each other based on the geographic location identified at step 706 and based on other information (tags descriptors, subject matter, topics, etc.). The correlations are also stored in database 116. The method 700 uses the situational analysis module 112 to analyze the correlated data and extract entities to base a situational analysis on in step 710. The entities may comprise, for example, traffic patterns, road blocks, famous personalities who have tweeted they are in the area, breaking news nearby, places of interest and the like. For example, if a user searches for "Times Square," the SANM 112 may generate information about shopping stores, restaurants and the like. A user may also filter the search query for more precise information about Times Square. At step 712, the situational awareness module 110 determines possible strategies for addressing the situational based on the situational analysis performed by the SANM 112, such as exit strategies, suggested tactical maneuvers, efficient routes for shopping and the like.

At step 714, the inferencing module 106 infers predictions based on the situational analysis and possible strategies and infers the location of data where location information was not initially available. The inferencing module 106 may also use the correlated data and situational analysis to statistically determine predictive attributes of a situation developing at a sporting event or shopper's moods during a holiday and predicting where the best sales are or where people are focusing their attention. The method ends at step 716.

Figure 8:
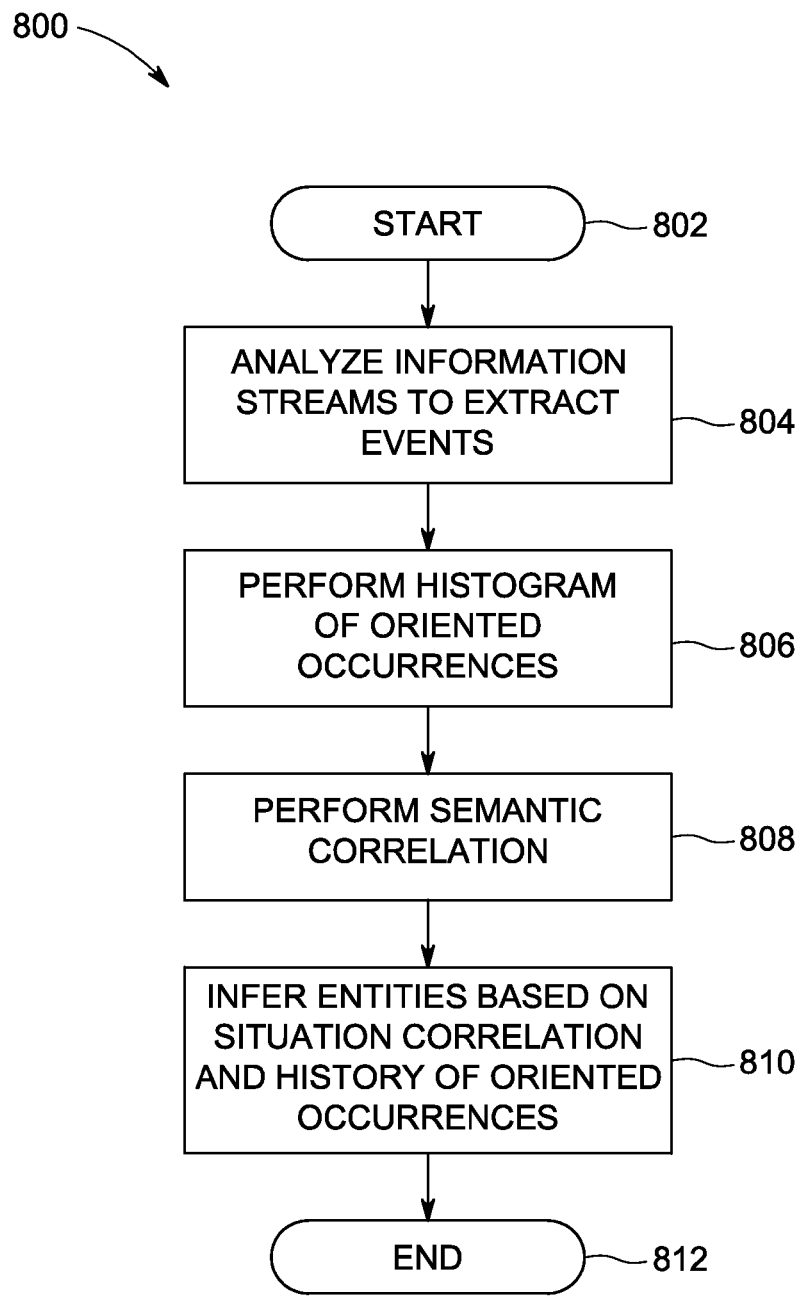
FIG. 8 is a flow diagram for a method for extracting events in accordance with at least one embodiment of the present invention.

FIG. 8 is a flow diagram for a method 800 for extracting events in accordance with at least one embodiment of the present invention. The method 800 is an implementation of the operation of situational analysis module 112 in FIG. 1 stored in memory 404 of the computer 400 and executed by the processor 402. The method 800 begins at step 802 and proceeds to step 804 where the information streams from S1 . . . Z and DS1 . . . DSN are analyzed to extract events performed by the SANM 112. The SANM retrieves data from database 116 and uses the event extractor 202 to extract video frames 204 and textual data 206. At step 806 of the method, the feature extraction module 208 performs a histogram of oriented occurrences of the video frames to establish entity classes and to track movement in those classes and actions taken by members of the classes, as described in pending U.S. patent application Ser. No. 12/489,667. At step 808, the semantic correlation module 210 performs semantic correlation for correlating the frames and text data to establish that the frames and text are linked, as described in commonly assigned, U.S. Provisional Patent Application Ser. No. 61/637,196, filed Apr. 23, 2012, herein incorporated by reference in its entirety. At step 810, the entities are inferred based on correlation followed by entity extraction using HO2 or other suitable algorithmic techniques. The method ends at step 812.

Figure 9:
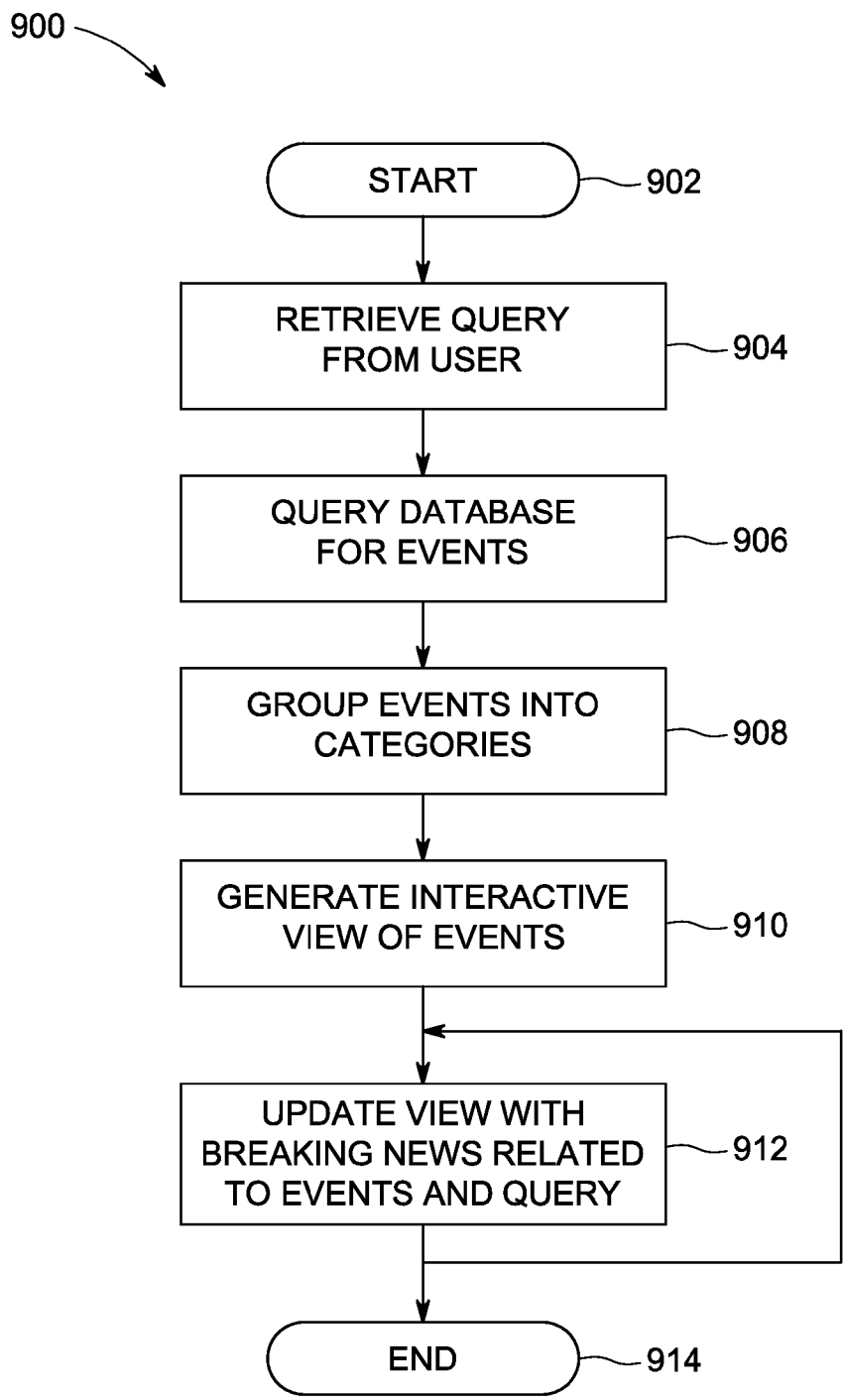
FIG. 9 is a flow diagram for a method for displaying related events to a user in accordance with at least one embodiment of the present invention.

FIG. 9 is a flow diagram for a method 900 for displaying related events to a user in accordance with at least one embodiment of the present invention. The method 900 is an implementation of the operation of visualization module 118 of FIG. 1 stored in memory 404 of the computer 400 and executed by the processor 402. The method begins at step 902 and proceeds to step 904 where the query module 114 of FIG. 1 receives a query from a user such as a search term. The query is parsed and run against the database 116 at step 906 to search for events that are associated in database 116 with a searchable term, tag, descriptor or the like that matches the parsed query. The visualization module 118 groups retrieved events into categories at step 908 based on the correlated data from the correlation module 108. At step 910, an interactive view of the categories of events is presented to the user, where a user may manipulate the view and change the modality of the view, i.e., to a view of people of interest, or locations of interest. At step 912, the view is updated periodically with breaking feeds relating to the entered query, until the user closes the viewer, ending the method at step 914.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer-implemented method comprising:
collecting data from a plurality of information sources;
identifying a geographic location associated with the data and forming a corresponding event according to the geographic location;
correlating the data and the event with one or more topics based at least partly on the identified geographic location and storing the correlated data and event; and
inferring the associated geographic location when it is determined that the data does not comprise explicit location information, including matching the data against a database of geo-referenced data.

2. The method of claim 1 further comprising:
receiving a query regarding at least one topic of the one or more topics; and
retrieving, in response to a query, the data correlated with the at least one topic of the query.

3. The method for claim 2 wherein the collecting further comprises indexing an additional information source in response to an ad-hoc request by a user.

4. The method of claim 1, wherein portions of the data comprise an image and matching the data comprises extracting one or more features of the image.

5. The method of claim 4, further comprising analyzing the data and extracting entities to form an analysis based on the entities.

6. The method of claim 5, further comprising recognizing, within the data and event, one or more entities associated with one or more of the topics, and wherein said correlating is further based on the one or more entities that were recognized.

7. The method of claim 6, wherein the one or more entities that were recognized are one or more of people or places of interest.

8. The method of claim 1, further comprising analyzing the correlated data to derive one or more predictions regarding a real-world situation related to one or more of the topics.

9. The method of claim 8, further comprising determining strategies for addressing the situation based on the analyzed correlated data.

10. The method of claim 1, further comprising generating an interactive visual representation of at least a selected portion of the data correlated with at least one of the topics.

11. The method of claim 10, wherein the visual representation comprises at least one representation from the following group: (a) a mosaic of a plurality of images included in the selected portion of the data, (b) a map comprising a visual representation for the selected portion of the data at a location on the map corresponding to the geographic location identified for the data, (c) a display of the data in a sequence corresponding to a time associated with the data.

12. The method of claim 1, further comprising analyzing correlated data and extracting entities to produce an analysis of the entities.

13. An apparatus comprising at least one processor configured to execute:
a collection module for collecting data from a plurality of information sources;
a geo-localization module, coupled to the collection module, for identifying a geographic location associated with the data and forming a corresponding event according to the geographic location;
a correlation module, coupled to the geo-localization module and the collection module, correlating the data and the event with one or more topics based at least partly on the identified geographic location and storing correlation data in a database; and
an inferencing module for inferring the associated geographic location when it is determined that the data does not comprise explicit location information, including matching the data against a database of geo-referenced data.

14. The apparatus of claim 13 further comprising:
a query module for receiving a query regarding at least one topic of the one or more topics and retrieving, in response to a query, the data correlated with the at least one topic of the query.

15. The apparatus for claim 14 wherein the collection module further comprises indexing an additional information source in response to an ad-hoc request by a user.

16. The apparatus of claim 13, wherein portions of the data comprise an image and matching the data comprises extracting one or more features of the image.

17. The apparatus of claim 16, further comprising a situation analysis module for analyzing the data and extracting entities to form an analysis based on the entities.

18. The apparatus of claim 17, the situation analysis module further comprising an event extractor for recognizing, within the data and event, one or more entities associated with one or more of the topics and the event, and wherein the correlation module correlates data based on the one or more entities that were recognized.

19. The apparatus of claim 18, wherein the one or more entities that were recognized are one or more of people or places of interest.

20. The apparatus of claim 13, further comprising a visualization module for generating an interactive visual representation of at least a selected portion of the data and event correlated with at least one of the topics.

21. The apparatus of claim 13, wherein the inferencing module further analyzes the correlated data to derive one or more predictions regarding a real-world situation related to one or more of the topics.

22. The apparatus of claim 21, further comprising a situational awareness module for determining one or more strategies for addressing the situation based on the analyzed correlated data.

23. The method of claim 10, wherein the visual representation comprises at least one representation from the following group: (a) a mosaic of a plurality of images included in the selected portion of the data, (b) a map comprising a visual representation for the selected portion of the data at a location on the map corresponding to the geographic location identified for the data, (c) a display of the data in a sequence corresponding to a time associated with the data.

* * * * *